US010613010B2

(12) United States Patent
Salomon et al.

(10) Patent No.: US 10,613,010 B2
(45) Date of Patent: Apr. 7, 2020

(54) INTERTIAL TORQUE DEVICE FOR VISCOMETER CALIBRATION AND RHEOLOGY MEASUREMENTS

(71) Applicant: AMETEK, INC., Berwyn, PA (US)

(72) Inventors: James A. Salomon, Providence, RI (US); Mark Genovese, Taunton, MA (US)

(73) Assignee: Ametek, Inc., Berwyn, PA (US)

( * ) Notice: Subject to any disclaimer, the term of this patent is extended or adjusted under 35 U.S.C. 154(b) by 247 days.

(21) Appl. No.: 15/833,237

(22) Filed: Dec. 6, 2017

(65) Prior Publication Data
US 2019/0170628 A1 Jun. 6, 2019

(51) Int. Cl.
*G01N 11/14* (2006.01)
*G01L 25/00* (2006.01)
*G01N 11/00* (2006.01)

(52) U.S. Cl.
CPC ............ *G01N 11/14* (2013.01); *G01L 25/003* (2013.01); *G01N 2011/0006* (2013.01); *G01N 2011/147* (2013.01)

(58) Field of Classification Search
CPC ........ G01N 11/10; G01N 11/14; G01N 11/16; G01N 11/162; G01N 11/167; G01N 2011/0006; G01N 3/24; G01N 2203/0021; G01N 2203/0037
See application file for complete search history.

(56) References Cited

U.S. PATENT DOCUMENTS

| | | | |
|---|---|---|---|
| 3,968,352 A | | 7/1976 | Andeen |
| 4,062,225 A | * | 12/1977 | Murphy, Jr. ............ G01N 11/14 73/54.35 |
| 4,445,365 A | * | 5/1984 | Selby ..................... G01N 11/14 73/54.34 |
| 4,480,481 A | * | 11/1984 | Buchele .................. E02D 1/022 73/784 |
| 4,484,468 A | * | 11/1984 | Gau ........................ G01N 11/14 702/50 |
| 5,209,108 A | * | 5/1993 | Shackelford ............ E21B 43/26 73/54.28 |

(Continued)

FOREIGN PATENT DOCUMENTS

| | | |
|---|---|---|
| DE | 29701570 U1 | 3/1997 |
| GB | 2388667 A | 11/2003 |

(Continued)

OTHER PUBLICATIONS

International Search Report and Written Opinion for International Application No. PCT/US2018/063985, dated Apr. 2, 2019, 12 pages.

*Primary Examiner* — David A Rogers

(74) *Attorney, Agent, or Firm* — RatnerPrestia

(57) ABSTRACT

An embodiment includes an inertial torque device (ITD) for calibrating a viscometer. The ITD comprises a body, a coupling for connecting the body to a viscometer measurement interface, a rotatable inertial load device coupled to the body, an electric motor coupled to the rotatable inertial load device and coupled to the body, and a controller configured to calibrate the viscometer by controlling the electric motor to rotate the rotatable inertial load device at a predetermined acceleration to apply a predetermined torque to the coupling connected to the viscometer.

29 Claims, 10 Drawing Sheets

(56) References Cited

U.S. PATENT DOCUMENTS

| | | | | |
|---|---|---|---|---|
| 5,509,297 A | * | 4/1996 | Müller | G01D 3/022 |
| | | | | 73/1.01 |
| 6,539,779 B2 | * | 4/2003 | Brookfield | G01N 11/14 |
| | | | | 73/54.35 |
| 7,526,941 B2 | | 5/2009 | Doe | |
| 9,513,202 B2 | * | 12/2016 | Mak | G01N 11/14 |
| 2006/0075805 A1 | * | 4/2006 | Moonay | G01N 11/14 |
| | | | | 73/54.28 |
| 2007/0041874 A1 | * | 2/2007 | Sukavaneshvar | B01F 7/26 |
| | | | | 422/68.1 |
| 2007/0295055 A1 | * | 12/2007 | Doe | G01N 11/14 |
| | | | | 73/1.02 |
| 2010/0071442 A1 | * | 3/2010 | Moon, Jr. | G01N 11/14 |
| | | | | 73/54.28 |
| 2010/0269571 A1 | * | 10/2010 | Raffer | G01N 11/142 |
| | | | | 73/54.28 |
| 2012/0024047 A1 | * | 2/2012 | Wollny | G01N 11/142 |
| | | | | 73/54.42 |
| 2012/0096929 A1 | * | 4/2012 | Baek | G01N 11/08 |
| | | | | 73/54.14 |
| 2014/0047904 A1 | * | 2/2014 | Mak | G01N 11/14 |
| | | | | 73/54.33 |
| 2014/0290346 A1 | * | 10/2014 | Salomon | G01N 11/14 |
| | | | | 73/54.32 |
| 2016/0223449 A1 | * | 8/2016 | Henzinger | G01N 11/14 |
| 2017/0212026 A1 | * | 7/2017 | Matthews | G01N 11/14 |

FOREIGN PATENT DOCUMENTS

| | | | | |
|---|---|---|---|---|
| JP | 61149841 A | * | 7/1986 | G01N 11/14 |
| WO | 9004161 A1 | | 4/1990 | |
| WO | 2007149488 A2 | | 12/2007 | |

* cited by examiner

INERTIAL TORQUE DEVICE FOR VISCOMETER CALIBRATION AND RHEOLOGY MEASUREMENTS

FIELD

The invention relates to an inertial torque device for testing calibration of viscometers and performing rheological measurements on fluids.

BACKGROUND

Calibration of rotary viscometers must be checked periodically to ensure that the instrument measurement system is not damaged or out of calibration due to changes or wear in the measurement mechanism. Rotary viscometers, for example, use a torsion spring to measure the torque produced by the rotational motion of a spindle in test fluid. The shear rate of the fluid is proportional to the viscosity, and determined by the spindle geometry and relative speed of rotation between the spindle and the test fluid. The torque to rotate the spindle is proportional to the viscosity of the fluid.

Normally, instrument calibration is checked with standard fluids. These standard fluids are test samples with a documented viscosity. Therefore, these standard fluids produce a known torque on the torsion spring at a controlled shear rate and temperature. This calibration method is useful, but prone to errors that can impact the accuracy of the calibration under real-world conditions, especially if the standard fluids are not kept at a precise temperature and properly maintained.

SUMMARY

An embodiment includes an inertial torque device (ITD) for calibrating a viscometer. The ITD comprises a body, a coupling for connecting the body to a viscometer measurement interface, a rotatable inertial load device coupled to the body, an electric motor coupled to the rotatable inertial load device and coupled to the body, and a controller configured to calibrate the viscometer by controlling the electric motor to rotate the rotatable inertial load device at a predetermined acceleration to apply a predetermined torque to the coupling connected to the viscometer.

An embodiment includes a method of controlling an inertial torque device (ITD) to calibrate a viscometer. The ITD has a coupling for connecting a body of the ITD to a viscometer measurement interface, a rotatable inertial load device coupled to the body of the ITD, an electric motor coupled to the rotatable inertial load device and coupled to the body of the ITD, and a controller configured to control the motor. The method comprises receiving, by the controller, an instruction requesting a predetermined torque, and calibrating the viscometer by controlling, by the controller, the electric motor to rotate the rotatable inertial load device at a predetermined acceleration corresponding to the predetermined torque to apply the predetermined torque to the coupling connected to the viscometer.

An embodiment includes an inertial torque device (ITD) having a rotatable body for performing rheology measurements. The ITD comprises a body, a coupling for connecting the ITD to a spindle for immersion in a fluid to be tested, a rotatable inertial load device coupled to the body of the ITD, an electric motor coupled to the rotatable inertial load device and coupled to the body, and a controller configured to perform the rheology measurements by controlling the electric motor to rotate the inertial load device at a plurality of different predetermined accelerations to apply a plurality of predetermined torques to the spindle.

An embodiment includes a self-contained spindle viscometer for measuring viscosity. The spindle viscometer comprising a body having a spindle shape, the body including a weighted bottom section for biasing the spindle viscometer in an upright position when immersed in a fluid to be tested, and a rotatable inertial load device enclosed within the body of the spindle viscometer. The rotatable inertial load device including an electric motor coupled to the rotatable inertial load device, a controller configured to perform viscosity measurements by controlling the electric motor to rotate the inertial load device to apply a predetermined torque to the body of the spindle viscometer, and determine a viscosity of the fluid under test based on the applied torque, and a wireless interface for outputting the determined viscosity.

DETAILED DESCRIPTION

Aspects of the invention provide an inertial torque device (ITD). In a first configuration, the ITD is used for testing calibration of viscometers. In a second configuration, the ITD is used as a Rheometer for performing rheological measurements. In a third configuration, the ITD performs controlled-shear viscosity measurements.

Viscosity is the measure of the internal friction of a fluid. This friction becomes apparent when a layer of fluid is made to move in relation to another layer; a shear strain is produced. A shear stress resists this shear strain. In a Newtonian fluid, the shear stress is exactly proportional to the shear rate; this proportionality is the fluids viscosity. Shearing occurs whenever the fluid is physically moved or distributed, as in pouring, spreading, spraying, mixing, etc. Highly viscous fluids resist shearing and require more force to move at the same rate than less viscous materials.

Viscosity data often functions as a "window" through which other characteristics of a material may be observed.

The performance of functional fluids such as coatings and lubricants is strongly correlated with viscosity, especially if the flow behavior needs to be controlled at a specific shear rate.

Generally, viscometers are accurate within a predetermined error percentage (%) of the range in use, and have a reproducibility within a predetermined %, so test results can be duplicated when the same model instrument is used. Thus, calibration of these viscometers is critically important for repeatability when multiple viscometers are used to verify viscosity.

Figure 1A:
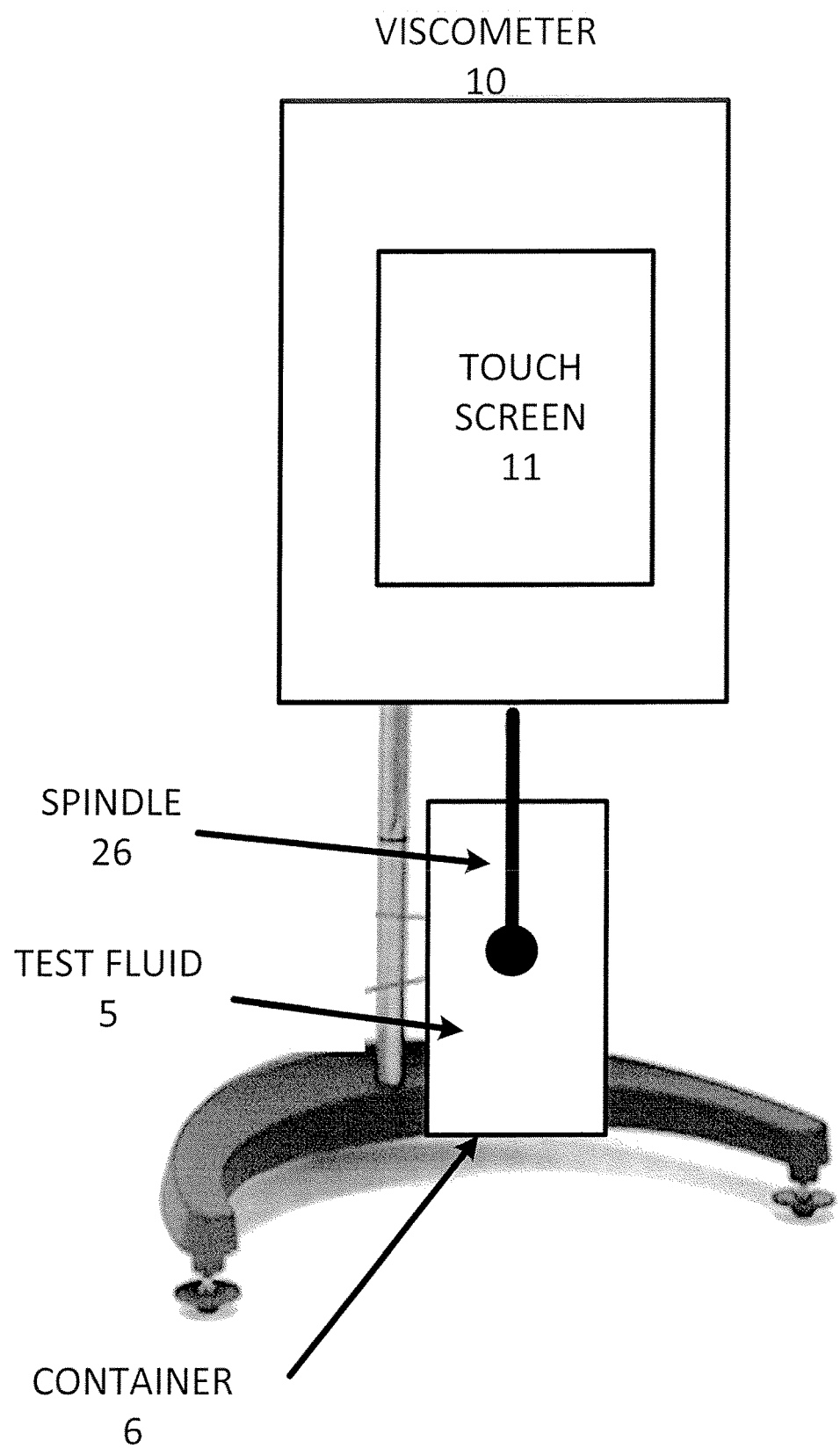
FIG. 1A is a view of a viscometer measuring viscosity of test fluid, according to an embodiment of the invention.

FIG. 1A shows a viscometer 10 having touchscreen 11. Viscometer 10 is configured to perform viscosity measurements on test fluid 5 in container 6. In one example, the fluid under test may be a Newtonian fluid having properties such that at a given temperature the viscosity of the fluid remains constant regardless of which viscometer, spindle or speed are used for measurements. In another example, the fluid under test may be a non-Newtonian fluid having properties such that when the shear rate is varied, the shear stress doesn't vary in the same proportion (or even necessarily in the same direction). The viscosity of these non-Newtonian fluids therefore change as the shear rate is varied. Thus, the experimental parameters of viscometer, spindle and speed all effect the measured viscosity of a non-Newtonian fluid.

The following relationships should be noted. Shear stress is a function of spindle geometry and torque, while Strain rate is a function of spindle geometry and rotation speed. Viscosity is the resistance to flow (e.g. a ratio of the applied force and flow rate) and is therefore equivalent to (Shear stress)/(Strain rate). In addition, it should be noted that torque is equivalent to (rotational inertia)×(rotational acceleration).

During operation of the viscometer, test parameters are input by the operator via interface 11 which may be a touch screen or the like. These parameters may include, but are not limited the geometry of the spindle, the geometry of the container holding the fluid under test, the identification and/or properties of the fluid under test, and the relative rotational speed between the spindle and the container.

Once the test begins, relative rotational motion is produced between spindle 26 and container 6. This relative rotational motion may be achieved in one of two manners. In a first example, the spindle 26 is rotated while the container 6 is fixed. In another example, the container 6 is rotated while the spindle 26 is fixed. Either method produces a controlled shear strain rate between the spindle 26 and the internal surface of container 6. This shear rate produces a torque on spindle 26 which is measured by the internal components (e.g., torsion spring not shown) of viscometer 10 to determine the viscosity of test fluid 5 (i.e., torque on the torsion spring correlates to viscosity of the fluid).

Figure 1B:
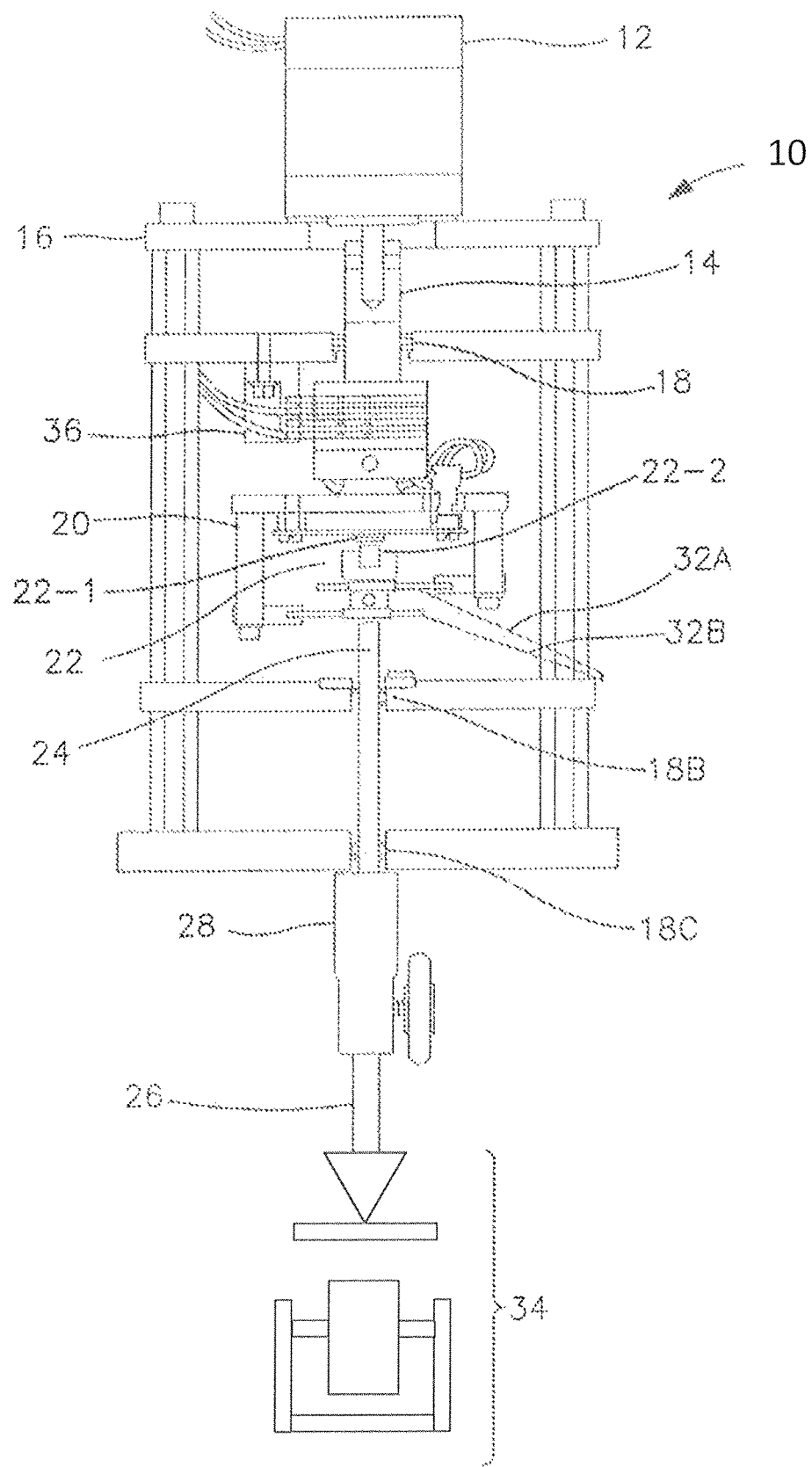
FIG. 1B is a view of internal components of the viscometer in FIG. 1A, according to an embodiment of the invention.

FIG. 1B shows the internal components of viscometer 10 including motor 12 (e.g., a stepper motor with a flywheel mounted on it) coupled to a driving shaft 14, the drive shaft being mounted from a static frame assembly 16 via a drive housing 18 and drive and sensing shaft bearings, 18B, 18C. A frame extension 20 of the driving shaft mounts one component 22-1 of a Hall Effect transducer 22 which confronts the other component 22-2. One of them (22-2) can be a dramatically magnetized magnet component and the other (22-1) a magnetic sensor with Hall Effect operation. A sensing shaft 24 suspends a spindle 26 via connector coupling 28 and is held from the frame assembly, via bearings 18B and 18C. Two spiral torsion springs 32A and 32B couple the sensing shaft to the driving shaft for commonly driven rotation but allowing for angular displacement. They may be coiled in opposite directions. Various forms of fluid measuring contact means indicated at 34 can be mounted at the spindle lower end. Change in viscosity of a measured fluid causes selective angular displacement of the 22-1 and 22-2 components to produce a signal taken out, via brush and slip ring assembly 36. A Hall Effect transducer has a voltage output from a magnetic field pickup (e.g., a semiconductor crystal) that varies with angular displacement in proportion to the strength of the magnetic field. In other embodiments, the Hall sensor may be replaced by a single hairspring and a rotary variable differential transformer (RVDT) or a system of optical sensors that measure angular displacement.

Many viscometers have a sensitive spring, sensing shaft assembly and point-jewel suspension which can be damaged. Any damage to these components would reduce accuracy of the viscometer. Therefore, the calibration of these types of rotary viscometers should be checked periodically, to ensure that the instrument measurement system (e.g., various components shown in FIG. 1B) are not damaged or out of calibration due to changes or wear in the measurement mechanism (e.g. torsion spring) over time. As described above, rotary viscometers measure the torque produced by the relative rotation between the spindle and the container at a controlled speed.

Typically, the rotational speed of the spindle or container is well controlled, and not subject to variation. When the drive system malfunctions, it is recognizable as a dynamic variation in speed, and produces a noise signal in the torque measurement. So if the torque signal is visibly consistent, it is a fair assumption that the speed is within tolerance, typically <0.1%. This may be beneficial in the calibration check for a viscometer.

As describe above, standard fluids are conventionally used to calibrate viscometers. However, many operators lack the ability to control or accurately measure the temperature of the standard fluid. This can be a source of significant uncertainty in the calibration process, as the actual viscosity of the standard fluid is temperature sensitive. In order to avoid the need to control temperature accurately, repair technicians conventionally use a combination of a master viscometer instrument and standard fluids to check that an instrument is properly calibrated (e.g., output of the master viscometer instrument is compared to the output of the instrument under test to see if they match). Without a master viscometer or temperature control, the fluid standards are limited in their ability to generate a known torque, and the accuracy of the calibration check can easily exceed 1%.

In order to avoid these possible errors, the ITD of the present application does not use standard fluids for calibration. The ITD of the present application uses the acceleration of a known inertia to produce torque, which eliminates temperature sensitivity, and provides a specific torque value with verification the torque produced is within specification. As described above, torque is equivalent to the (rotational inertia)×(rotational acceleration) produced by the ITD. This ITD may act in place of the master viscometer, and eliminate the inconvenience and limited accuracy of fluid standards, with requirements for temperature control.

Figure 2A:
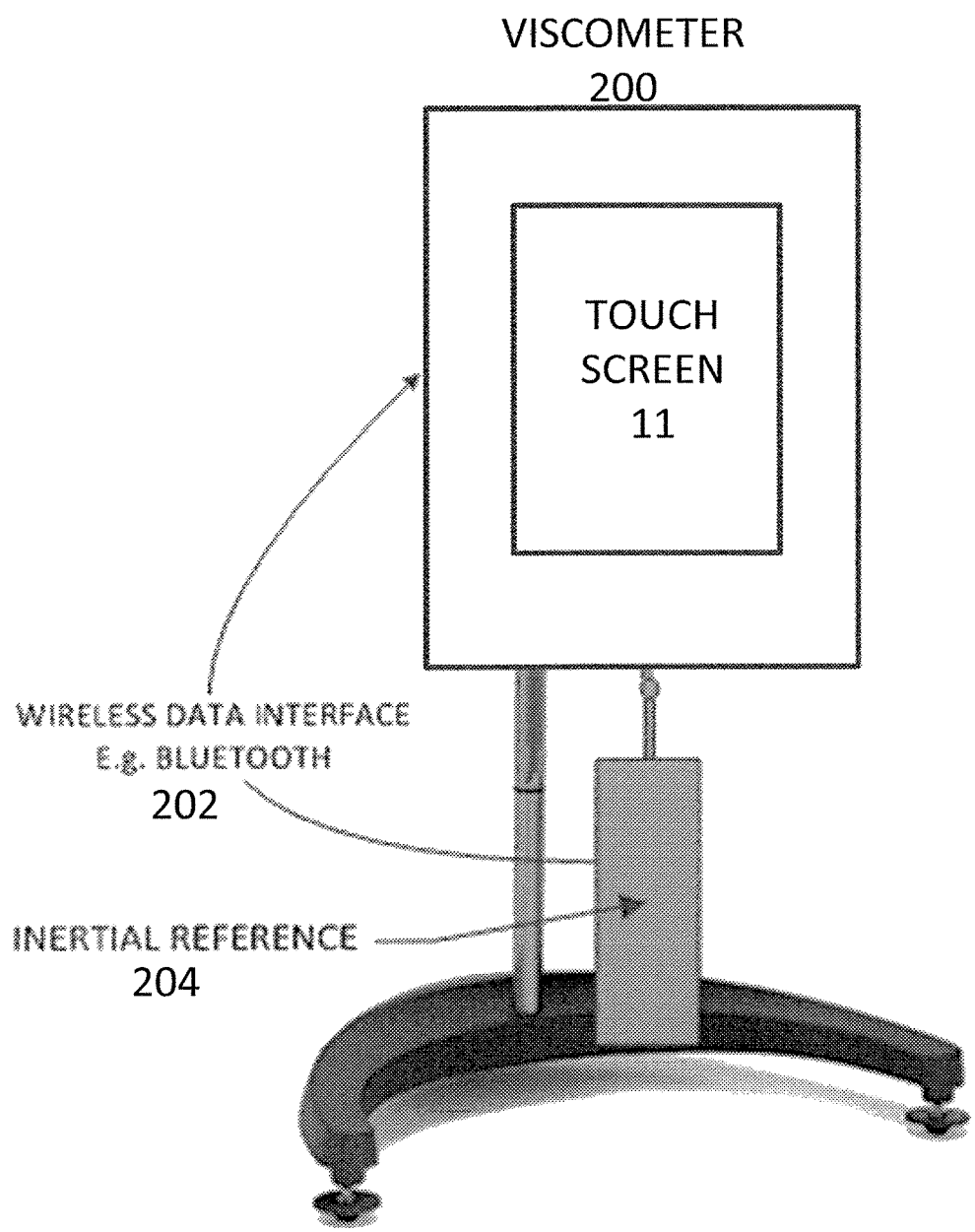
FIG. 2A is a view of a viscometer connected to an inertial torque device, according to an embodiment of the invention.

FIG. 2A shows an example of the ITD 204 in use with viscometer 200. Specifically, FIG. 2A is similar to FIG. 1A, but replaces the test fluid and container 6 with ITD 204, which is coupled to viscometer 200 at the same location that spindle 26 couples to viscometer 200 in FIG. 1A (i.e., ITD 204 is used in place of spindle 26 and container 6).

ITD 204 in FIG. 2A includes an internal reaction wheel (not shown) including a motor and an inertial device (also not shown). ITD 204 is calibrated, so that a specific rotor acceleration of the motor produces an accurate torque on the shaft of ITD 204. Reaction wheels produce torque by accelerating a rotational system (e.g. motor and flywheel) to apply torque to the supporting structure of the motor (e.g., the body and shaft of ITD 204). ITD 204 is effectively attached to the viscometer like a spindle, and is self-contained, with no connections to "ground" which can affect the torque measured by the rotary viscometer's torque transducer (e.g. encoder coupled to the torsion spring). In the proposed system, the reaction wheel accelerates and decelerates at a controlled rate, and in turn, the rotating system inertia is accurately controlled in order to produce an accurately controlled torque on the measurement device of viscometer 200 to simulate the torque that would be experienced when measuring the viscosity of a standard fluid. ITD 204 may therefore aid in the calibration of a rotary viscometer by producing a known standard torque to a much higher accuracy than typical fluid-based calibration methods.

During operation, the operator controls ITD 204 to apply a predetermined amount of torque to the viscometer spindle coupling. This predetermined amount of torque is proportional to a predetermined viscosity. Thus, ITD 204 is essentially simulating the torque that would be measured for a test fluid of a given viscosity. Calibration of viscometer 200 may be performed by determining the difference between the simulated viscosity output by ITD 204 and the viscosity measured by viscometer 200. The difference between these values indicates if the viscometer requires maintenance (i.e., they should be equivalent if the viscometer is properly calibrated). Viscometers may also have an option to display the measured torque as a percentage of a full scale on touchscreen 11. Therefore, in one example, calibration of viscometer 200 may be performed by determining the difference between the simulated torque output by ITD 204 and the torque measured by viscometer 200.

Figure 2B:
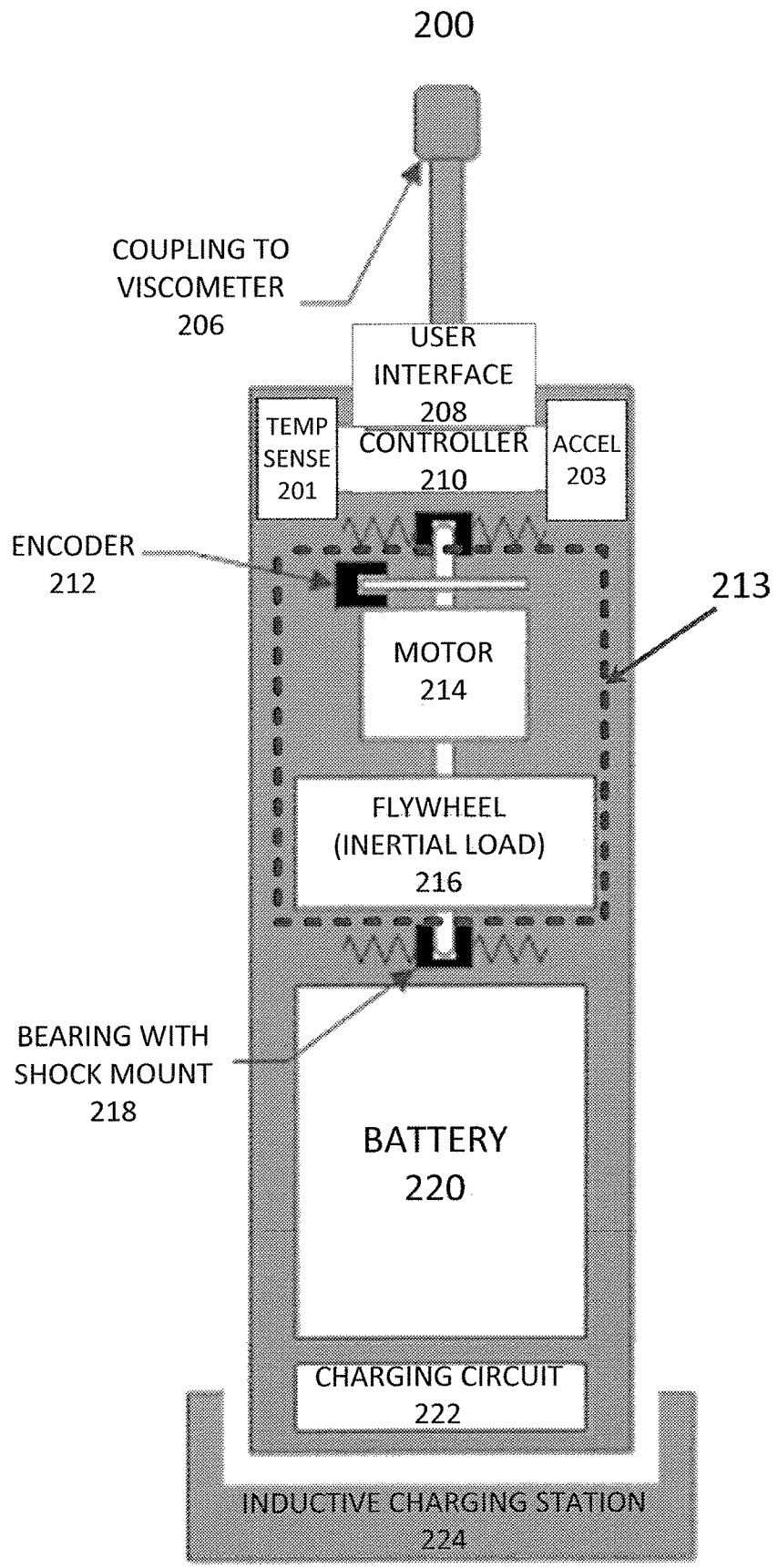
FIG. 2B is a view of internal components of the inertial torque device in FIG. 2A, according to an embodiment of the invention.

FIG. 2B shows the internal components of ITD 204 including Reaction wheel 213 comprising motor 214 and inertial load 216 (e.g. flywheel). Reaction wheel 213 is coupled to the body of ITD 204 via shock bearing 218, a controller 210 that controls Reaction wheel 213 and receives feedback from encoder 212 to ensure that the acceleration rate of the motor is accurately controlled, and optional temperature sensor 201 that measures ambient temperature and optional accelerometer 203 that measures displacement of ITD 204. The inertia of the Reaction wheel 213, is generated by the spinning motor rotor and flywheel. This inertia is precisely controlled or measured during operation. Flywheel 216 may also be connected to the body of ITD 204 via shock bearing 218. In general, controller 210 controls motor 214 to spin flywheel 216. As the motor 214 and flywheel 216 accelerates, it generates a torque which produces and equal and opposite opposing torque applied to the body and shaft of ITD 204 which is connected to the viscometer coupling 206. This applies a torque to the torsion spring mechanism in the viscometer. The measurement of the rotational deflection of this torsion spring correlates to the simulated viscosity.

As can be seen in FIG. 2B, no wires or external connections, or force interactions are present. As a result, ITD 204 includes battery 220 which may be rechargeable by way of charging circuit 222 that receives power from a wired electrical connector (when not in use) or from inductive charging station 224. It is noted that as controller accelerates the motor, the battery begins discharging. Controller 210 can recharge the battery 220 in a number of different ways. In one example, controller 210 can instruct charging circuit 222 to recharge the battery. In another example, controller 210 can implement dynamic braking to allow the energy generated by the motor when the motor is decelerating to recharge the battery.

ITD 204 is packaged in such a way that the unit can withstand rough handling and exposures in a lab environment. The ITD 204 is also well balanced. In one example, ITD 204 is dynamically balanced (e.g. flywheel 216) so the rotary viscometer can rotate the ITD 204 to simulate a typical viscosity measurement. If the ITD is equipped with accelerometer 203, it can be used to measure the rotational speed, confirming that the drive system is functioning properly.

In one embodiment, the ITD 204 is equipped with a user interface 208 to receive user input and output. For example, light emitting diodes (LEDs) could provide status information including but not limited to showing that ITD 204 is charged, producing a torque, or not functioning properly. A switch (not shown) could provide the input when to start applying a torque. In one embodiment, the operator could turn on ITD 204 and the viscometer, and while it shows a green LED, the torque measured by the viscometer is compared to the known torque produced by ITD 204. An enhanced alphanumeric display (e.g., touch screen, etc.) could also be implemented on ITD 204 to provide a way to vary the torque over a range, and select a specific torque.

The torque produced by the ITD 204 is a function of the Reaction wheel inertia combined with the acceleration profile of the inertial load. Thus, it is beneficial to ensure the proper operation of ITD 204. In the event that ITD 204 is damaged or breaks due to wear, the status of the internal components can readily be assessed. For example, encoder 212 is checked (e.g., constantly, periodically, etc.) by controller 210 during calibration. The output of encoder 212 assures that flywheel 216 is accelerating properly and therefore applying the proper amount of torque to coupling 206. Any motion errors in the rotation of motor 214 and thus flywheel 216 are readily recognized, and the torque calibration could be aborted. For example, if the motor shaft were bent or misaligned, the motor controller 210 would almost certainly see fluctuations in the motor drive parameters by monitoring encoder 212. Optionally, an accelerometer 203 may also be used to further enhance the self-diagnostic capabilities of the ITD (e.g., detect vibration, etc.). Any discrepancies in the motion or behavior of the ITD 204 can be readily be logged and reported to the user. The accelerometer 203 could also be used to verify that the viscometer rotational speed is within the required range for proper accuracy.

For example, the accelerometer 203 may measure the rotational speed of the ITD body as it is driven by the viscometer. This speed may be used to verify that the viscometer is functioning properly. This would enable precisely simulating the operation of the viscometer as part of the calibration process. In addition, this speed could also be used to measure the spring wind-up, and to check the stiffness and hysteresis in the measurement system.

In addition, the ITD may include a temperature sensor 201 to assess the ambient temperature. This would allow for temperature compensation of the inertia, and also provide a record of ambient conditions for the viscometer calibration.

Furthermore, the flywheel of the reaction wheel can be sized appropriately to limit the inertia accuracy due to variations in the other rotating parts that compose the reaction wheel, such as the motor rotor. Making the flywheel out of an alloy such as Invar would minimize the variation in inertia due to thermal expansion.

As described above, it is beneficial to accuracy that ITD 204 is not connected to wires or any other structure other than the viscometer. Thus, in order to communicate with ITD 204 a wireless interface such as Bluetooth may be implemented. This could allow ITD 204 to communicate to the viscometer and to a remote PC or smart phone (not shown).

For example, if the viscometer has the capability of using wireless communications to interact directly with ITD 204, the torque applied and the torque measured can be directly assessed in the viscometer. No operator interaction would be needed to complete a calibration, other than installing the ITD 204 on the measurement coupling and initiating the process. One advantage of this method is that ITD 204 does not have to maintain the torque for a long period. As soon as the measured torque has settled, the value can be retained. In this manner, ITD 204 could be used to recalibrate the viscometer electronically, over a range of torques.

The use of a properly shaped acceleration profile can apply the torque in a manner that limits oscillation in a spring-based rotary viscometer. This reduces settling time for the torque measurement, and enables short applications of high torques. ITD 204 may continue to accelerate to the point where the motor power and components can operate at high speeds if needed.

ITD 204 as described above is implemented as an accessory that is installed by the operator. However, another possible embodiment is to install ITD 204 as an element of the measuring system. In this manner, the viscometer can check calibration without operator intervention. With the ITD 204 installed on the measurement axis, the viscometer could set the zero torque on startup, and also determine the measurement accuracy for a range of internally-applied torques. This would eliminate the uncertainty produced by large temperature fluctuations or rough handling of the measurement system. Errors of linearity could be corrected by using ITD 204 to apply a range of torques. By reversing the applied torque of ITD 204, the hysteresis could also be measured and a correction applied.

Figure 2C:
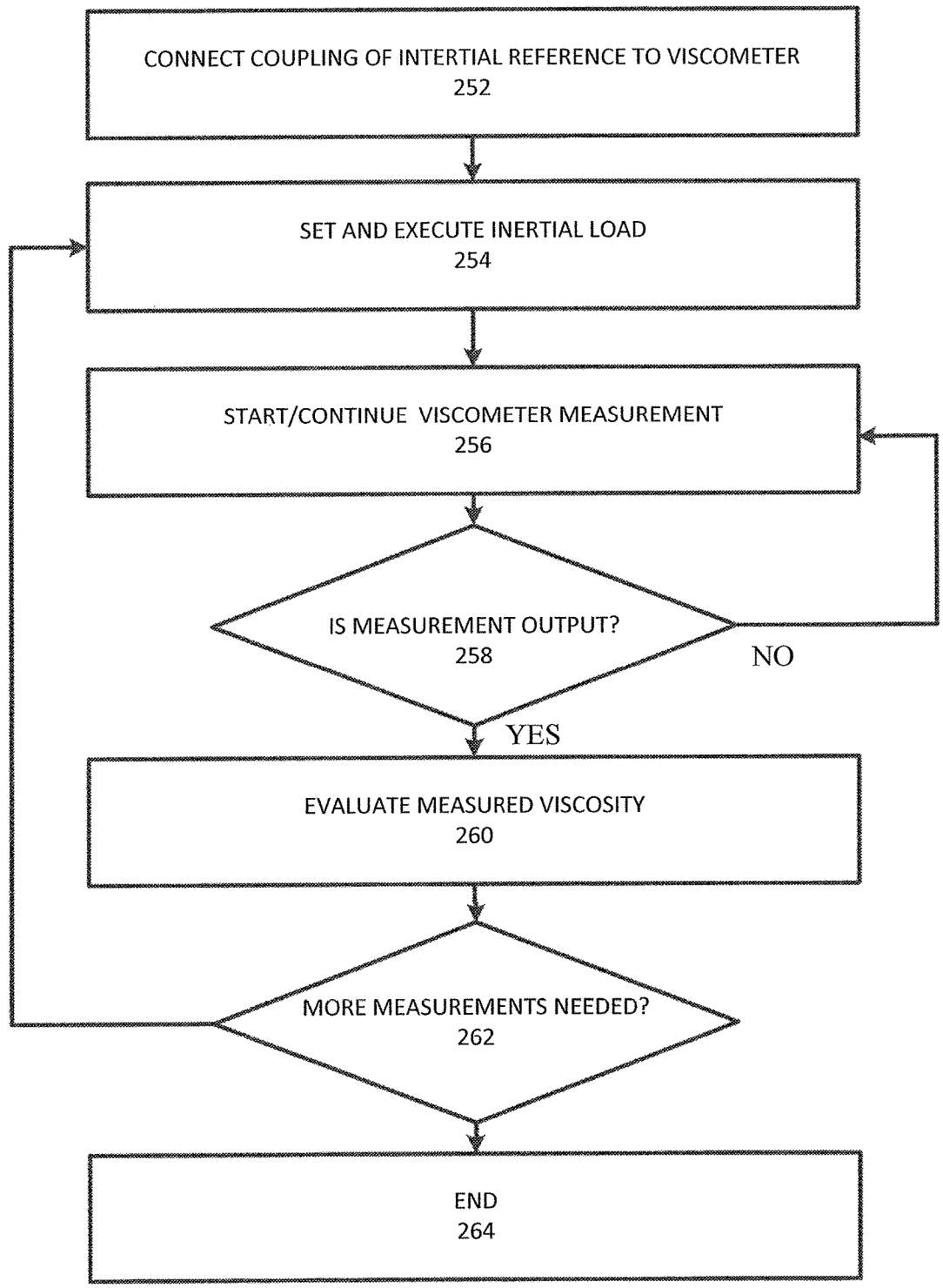
FIG. 2C is a flowchart describing the viscometer measurement process, according to an embodiment of the invention.

FIG. 2C shows a flowchart of the operation of ITD 204 for calibrating a viscometer. In step 252, the operator connects ITD 204 to the viscometer. This connection is similar to coupling a spindle to the viscometer. The viscometer typically has a coupling. The shaft of ITD 204 may be inserted into this coupling and locked in place just as a spindle would be.

In step 254, the operator may use the wireless interface or the user interface on ITD 204 to set and execute a predetermined torque to be applied to the viscometer. Once the torque load is applied, the viscometer starts measures (step 256) the torque applied to the viscometer coupling.

It is noted that the following steps 258-264 may be performed manually by the operator, or automatically by controller 210 of ITD 204 via the wireless interface. For example, in step 258, the operator may determine if the viscosity measurement is output by the viscometer by viewing the viscometer display 11. Alternatively in step 258, controller 210 of ITD 204 may make this decision based on wireless communications received from the viscometer. If the measurement is not output by the viscometer yet, then the operator or controller 210 of ITD 204 allows the measurement to continue. If measurement is output, the operator or controller 210 of ITD 204 evaluates the measured viscosity in step 260 (e.g. operator visually compares the output viscosity to the viscosity simulated by the ITD, or the controller numerically compares the output viscosity to the viscosity simulated by the ITD). In step 262, the operator may determine if more measurements are needed. Alternatively in step 262, controller 210 of ITD 204 may make this decision based on wireless communications received from the viscometer. If more measurements are desired (e.g. different simulated viscosities), then the operator or controller 210 of ITD 204 sets another inertial load in step 254 and repeats the process. If, however, no more measurements are desired, the operator or controller 210 ends the process in step 264.

Although viscosity is an adequate measurement for some fluids, other fluids (e.g., liquids, slurries, suspensions, elastomers, plastics, gels, melts, powdery masses, plastics, elastomers, clays, foodstuffs and the like) may require more than basic viscosity measurement in order to achieve adequate characterization. Rheometers are typically employed for these types of fluids.

Figure 3A:
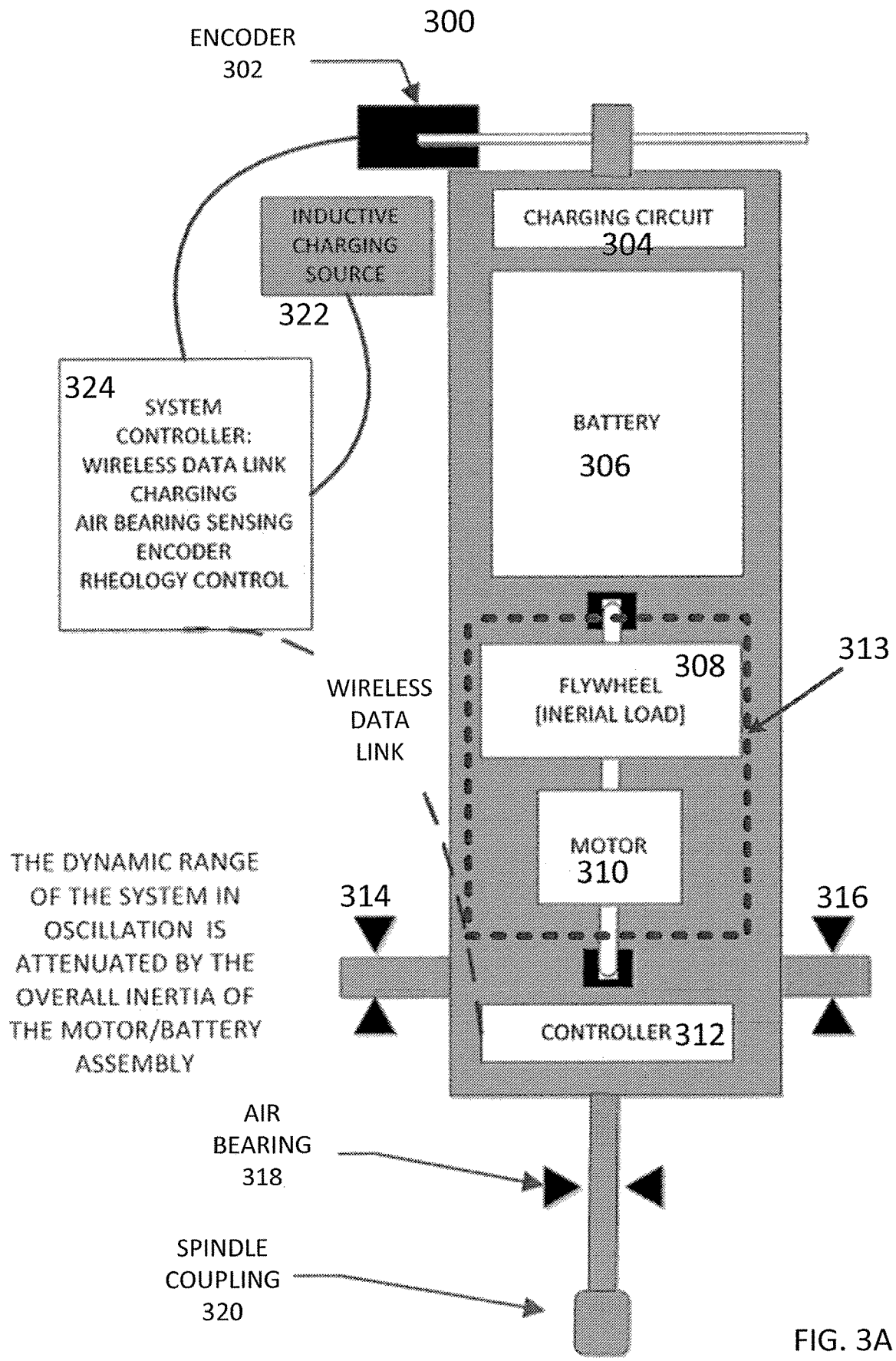
FIG. 3A is a view of the inertial torque device configured as a Rheometer, according to an embodiment of the invention.

ITD 204 has been described above as a device for calibrating viscometers. However, it may also be used as a Rheometer. For example, FIG. 3A shows ITD 204 being inverted and configured as a Rheometer. Rheometer 300 shown in FIG. 3A is essentially an inverted ITD 204 with some modifications. For example, similar to ITD 204, Rheometer 300 includes spindle coupling 320, controller 312, Reaction wheel 313 including inertia 308 (e.g., flywheel) and motor 310, battery 306, battery charging circuit 304, inductive charging source 322 and wireless interface 324. However, unlike ITD 204, the body of the device is not designed to hang from a viscometer like a spindle. In contrast, Rheometer 300 is designed to be mounted via air bearings 314 and 316. The air bearings support Rheometer 300 upright while allowing the body of Rheometer 300 to rotate freely.

During operation, a spindle is coupled to spindle coupling 320 of the Rheometer and is inserted into a fluid to be tested. Controller 312 then instructs motor 310 to accelerate the flywheel and produce a controlled torque. This torque results in the body of Rheometer 300 rotating. This rotational displacement is measured by encoder 302 which monitors the rotation of the body of Rheometer 300. This rotational displacement rate measured by encoder 302 correlates to the shear rate of the fluid under test (e.g. large rotational displacement indicates large viscosity). In this manner, the viscosity can be measured according to the applied torque and resulting shear rate.

Figure 3B:
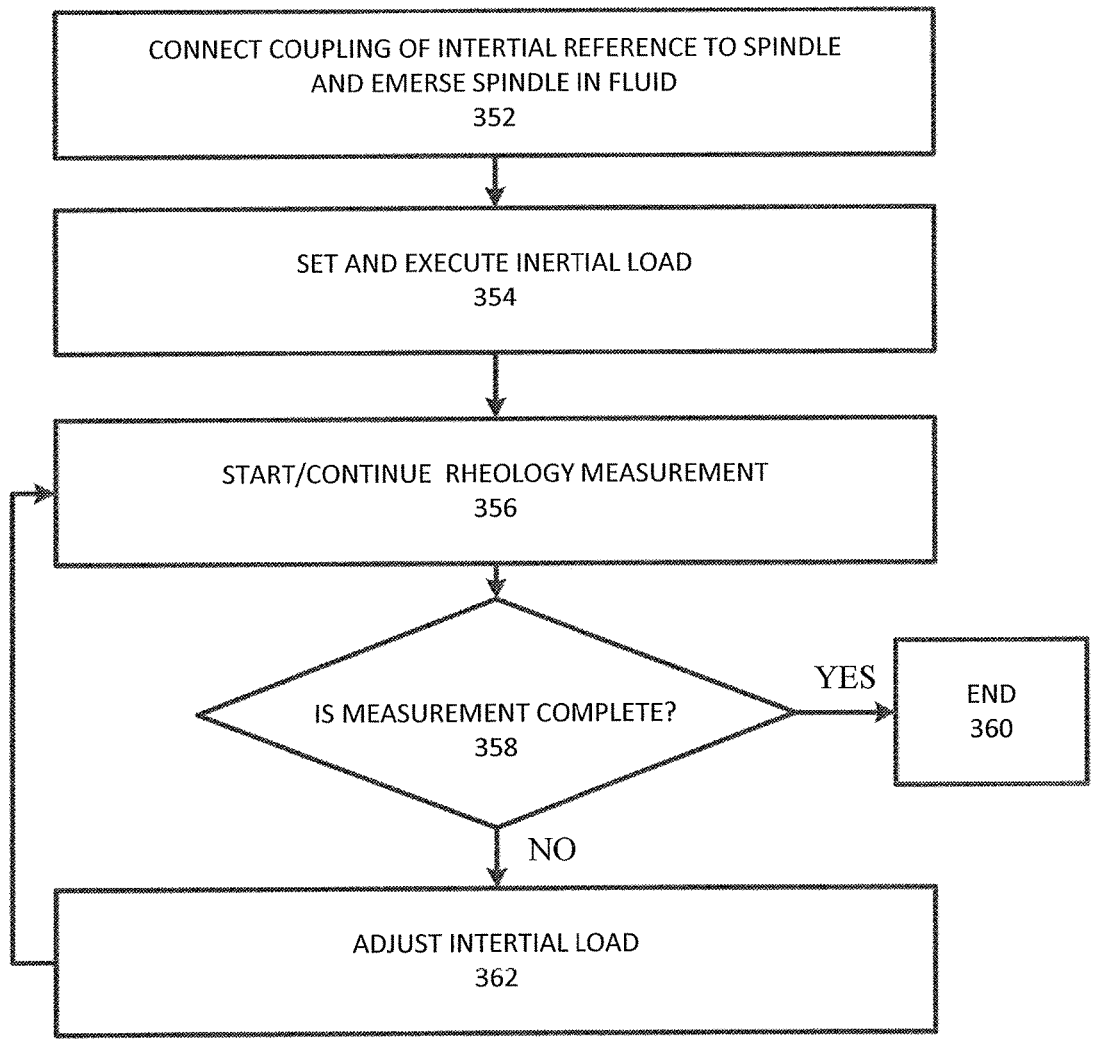
FIG. 3B is a flowchart describing the Rheometer measurement process, according to an embodiment of the invention.

FIG. 3B shows a flowchart for the Rheometer 300 measurement process. In step 352, a spindle of known geometry is connected to Rheometer 300 and then inserted into fluid that is contained in a container of known geometry. In step 354, controller 312 sets and executes a range of torques that may be beneficial in determining the rheological characteristics of the fluid. In step 356 controller 312 starts the rheology measurements. These measurements may be performed by oscillating the inertial load. For example, controller 312 may use an oscillating signal (e.g., sinusoid) to accelerate the inertia in a first direction (clockwise) and measure the rotational displacement, and then accelerate the inertia in a second opposite direction (e.g., counter-clockwise) and measure the rotational displacement. In step 358 controller 312 determines if the rheological measurements are complete. If they are complete, the process is ended in step 360. If they are incomplete, controller may then adjust the inertial load (control the frequency and amplitude of oscillation) and repeat the process in step 356. This may be repeated as many times as desired to adequately characterize the rheological properties of the fluid.

Figure 4A:
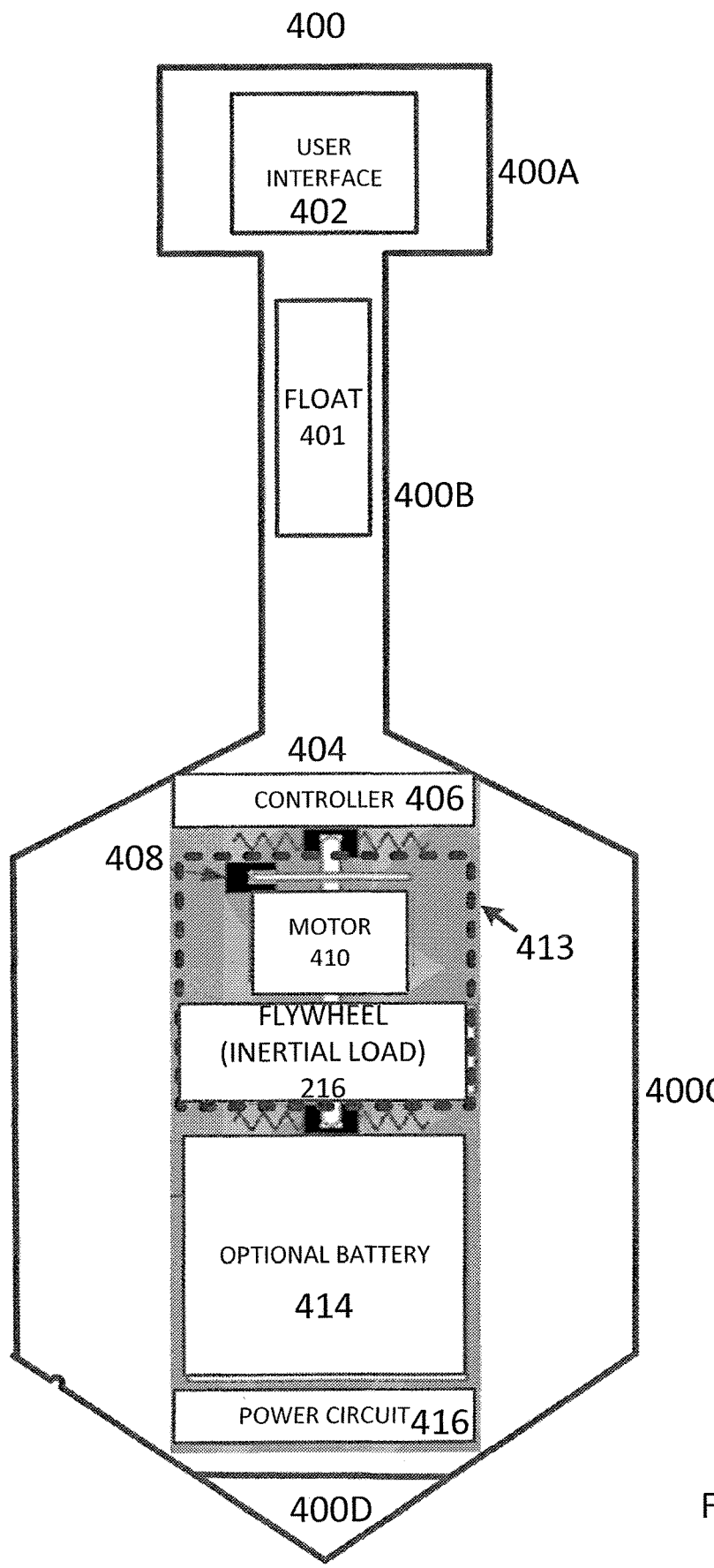
FIG. 4A is a view of the internal components of a spindle viscometer, according to an embodiment of the invention.

ITD 204 has been described above as a device for calibrating viscometers and as a device for performing Rheometer measurements. However, in another configuration, it may also be used as a stand-alone viscometer. For example, FIG. 4A shows ITD 404 being enclosed in a spindle and configured as a stand-alone viscometer (i.e. a spindle viscometer). Spindle viscometer 400 shown in FIG. 4A includes a spindle that generates and applies (without the assistance of viscometer machine 10) an inertial torque to a fluid under test. For example, spindle viscometer 400 includes a head portion 400A, neck portion 400B, body portion 400C and weighted bottom portion 400D. In the illustrated embodiment, the bottom portion of the spindle viscometer comes to a beveled point. Although spindle viscometer 400 is shown in FIG. 4A to have a specific geometry, other geometries are possible. Spindle viscometer 400 may be manufactured from materials such as metals, plastics, a combination of metals and plastics, etc.

Body portion 400C of the spindle viscometer includes a cavity where ITD 404 is enclosed. ITD 404, includes controller 406, Reaction wheel 413 including inertial load 412 (e.g., flywheel) and motor 410, optional battery 414, power circuit 416, and wireless user interface 402. The operations of ITD 404 and its internal components are not described in further detail, as they are similar to ITD 204 already described above.

However, unlike ITD 204 in the FIG. 2A, ITD 404 is not designed to hang from a viscometer. In contrast, ITD 404 is incorporated into the spindle itself, and is designed to be immersed in fluid under test (e.g. viscometer machine 10 is not needed). In order to hold spindle viscometer 400 upright in the fluid, weight section 400D is provided. Weight section 400D has sufficient weight to ensure that spindle viscometer 400 does not float or tilt to the side when immersed in the fluid. A float 401 may also be incorporated into or attached to neck 400B of spindle viscometer 400. The buoyancy of the float may be used to hold spindle viscometer 400 in the upright position. Although weight section 400D and float 401 are shown in FIG. 4A, other types of devices may be used to hold spindle viscometer 400 upright.

Figure 4B:
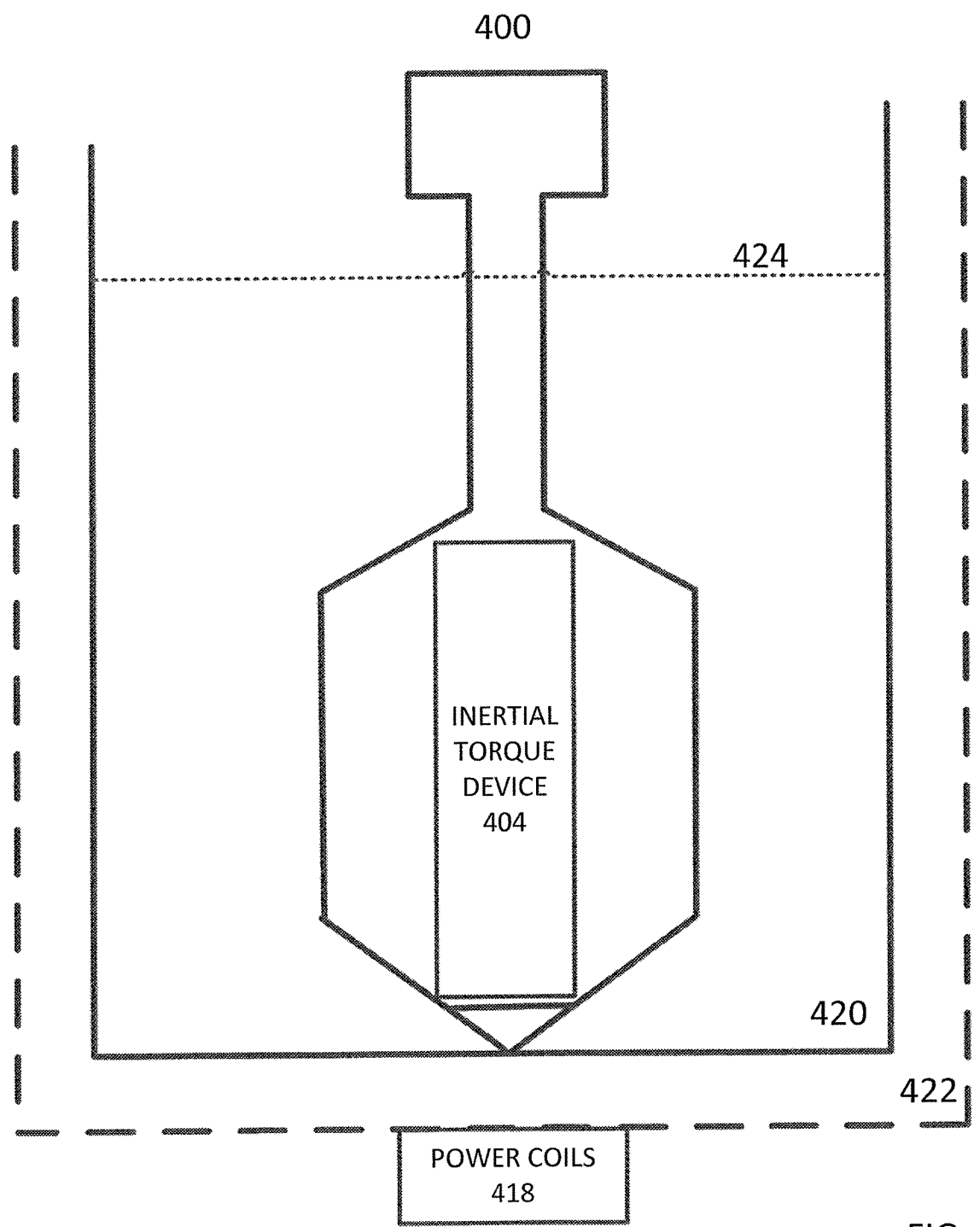
FIG. 4B is a view of the spindle viscometer in FIG. 4A immersed in fluid to be tested, according to an embodiment of the invention.

As shown in FIG. 4B, prior to operation, spindle viscometer 400 is inserted into a fluid to be tested 424 held by fluid container 420. Optionally, fluid container 420 may also be surrounded by water container 422 which circulates temperature controlled water around container 420. This ensures that the fluid under test is at a desired temperature for accurate viscosity measurements. In addition, power coils 418 may be provided to inductively power ITD 404, which may or may not have an internal battery. For example, power coils 418 may charge an internal battery in ITD 404, or directly power the motor of ITD 404.

During operation (e.g. during a viscosity test), controller 406 instructs motor 310 to accelerate and produce a controlled torque that may be set by the technician through wireless user interface 402 (e.g. Bluetooth transceiver, WiFi transceiver, etc.). This torque results in the body of spindle viscometer 400 rotating. This rotational displacement is measured by an accelerometer 203 (not shown) located on the controller board. This rotational displacement measured by the accelerometer 203 (not shown) correlates to the viscosity of the fluid under test (e.g. large rotational displacement indicates large viscosity).

Figure 4C:
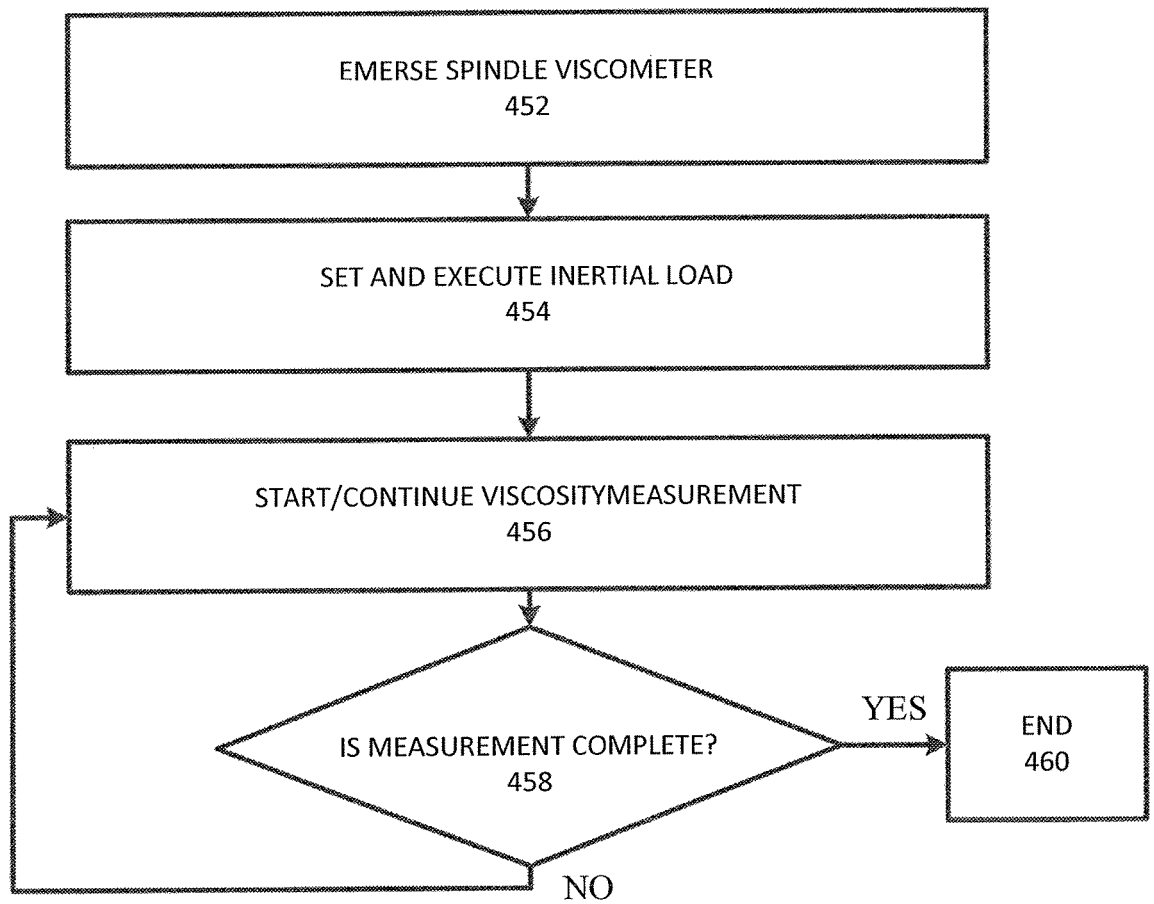
FIG. 4C is a flowchart describing the spindle viscometer measurement process, according to an embodiment of the invention.

FIG. 4C shows a flowchart for the spindle viscometer 400 measurement process. In step 452, spindle viscometer 400 of known geometry is immersed into the fluid that is contained in a container of known geometry. In step 454, controller 406 sets and executes a torque profile in ITD 404 that may be beneficial in determining the viscosity characteristics of the fluid. In step 456, controller 406 starts the viscosity measurements by applying the torque. The applied torque is resisted by the fluid. The resulting velocity of the spindle for a known applied torque can be used to determine the viscosity. In step 458, controller 406 determines if the viscosity measurements are complete. If the measurements are complete, the process ends in step 460. If the measurements are incomplete, controller may then continue the viscosity measurements. This may be repeated as many times as desired to adequately characterize the viscosity of the fluid.

The measurement of viscometer 40 is further enhanced by the inclusion of temperature sensing at close proximity to the sheared fluid. This provides an accurate measurement of temperature in addition to the measurement of viscosity. The temperature measurement can also be used to control the temperature bath via the wireless data connection.

The steps shown in FIGS. 2C, 3B and 4C are performed by controller upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller described herein, such as the steps shown in FIGS. 2C, 3B and 4C, are implemented in software code or instructions which are tangibly stored on a tangible computer readable medium. Upon loading and executing such software code or instructions by the controller, the controller may perform any of the functionality of the controller described herein, including the steps shown in FIGS. 2C, 3B and 4C described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Although the invention is illustrated and described herein with reference to specific embodiments, the invention is not intended to be limited to the details shown. Rather various modifications may be made in the details within the scope and range of equivalence of the claims and without departing from the invention.

The invention claimed is:

1. An inertial torque device (ITD) for calibrating a viscometer, the ITD comprising:
   a body;
   a coupling for connecting the body to a viscometer measurement interface;
   a rotatable inertial load device internal to the body and coupled to the body;
   an electric motor internal to the body, coupled to the rotatable inertial load device and coupled to the body; and
   a controller internal to the body and configured to calibrate the viscometer by controlling the electric motor to rotate the rotatable inertial load device at a predetermined acceleration to apply a predetermined torque to the coupling connected to the viscometer.

2. The ITD of claim 1, further comprising:
a user interface for setting the predetermined torque of the ITD.

3. The ITD of claim 1, further comprising:
an encoder for monitoring the rotation of the electric motor;
wherein the controller is further configured to receive input from the encoder and confirm that the electric motor is rotating at the predetermined acceleration.

4. The ITD of claim 1, further comprising:
a battery for powering the electric motor; and
a wireless battery charging station for charging the battery.

5. The ITD of claim 1, wherein the body of the ITD is independent of external connections when the calibration is being performed.

6. The ITD of claim 1, wherein the controller is further configured to:
receive a viscosity measurement from the viscometer;
compare the viscosity measurement to a known viscosity associated with the predetermined torque applied by the ITD; and
determine that the viscometer is calibrated if the received viscosity and the known viscosity match.

7. The ITD of claim 1, further comprising:
an accelerometer which measures a rotational speed of the body of the ITD as driven by the viscometer, the controller using the rotational speed to calibrate the viscometer.

8. The ITD of claim 1, further comprising:
a temperature sensor which measures ambient temperature, the controller using the ambient temperature to calibrate the viscometer.

9. An inertial torque device (ITD) for calibrating a viscometer, the ITD comprising:
a body;
a coupling for connecting the body to a viscometer measurement interface;
a rotatable inertial load device coupled to the body;
an electric motor coupled to the rotatable inertial load device and coupled to the body; and
a controller configured to calibrate the viscometer by controlling the electric motor to rotate the rotatable inertial load device at a predetermined acceleration to apply a predetermined torque to the coupling connected to the viscometer,
wherein the rotatable inertial load is a flywheel for applying the predetermined torque to the coupling.

10. A method of controlling an inertial torque device (ITD) to calibrate a viscometer, the ITD having a coupling for connecting a body of the ITD to a viscometer measurement interface, a rotatable inertial load device internal to the body and coupled to the body of the ITD, an electric motor internal to the body, coupled to the rotatable inertial load device and coupled to the body of the ITD, and a controller internal to the body and configured to control the motor, the method comprising:
receiving, by the controller, an instruction requesting a predetermined torque; and
calibrating the viscometer by controlling, by the controller, the electric motor to rotate the rotatable inertial load device at a predetermined acceleration corresponding to the predetermined torque to apply the predetermined torque to the coupling connected to the viscometer.

11. The method of claim 10, further comprising the step of:
setting, by a user interface, the predetermined torque of the ITD.

12. The method of claim 10, further comprising the steps of:
powering, by a battery, the electric motor; and
charging, by a wireless battery charging station, the battery.

13. The method of claim 10, further comprising the steps of:
receiving, by the controller, input from an encoder of the electric motor; and
confirming, by the controller, that the electric motor is rotating at the predetermined acceleration.

14. The method of claim 10, wherein the body of the ITD is independent of external connections when the calibration is being performed.

15. The method of claim 10, further comprising the steps of:
receiving, by the controller, a viscosity measurement from the viscometer;
comparing, by the controller, the viscosity measurement to a known viscosity associated with the predetermined torque applied by the ITD; and
determining, by the controller, that the viscometer is calibrated if the received viscosity and the known viscosity match.

16. A method of controlling an inertial torque device (ITD) to calibrate a viscometer, the ITD having a coupling for connecting a body of the ITD to a viscometer measurement interface, a rotatable inertial load device including a flywheel coupled to the body of the ITD, an electric motor coupled to the rotatable inertial load device and coupled to the body of the ITD, and a controller configured to control the motor, the method comprising:
receiving, by the controller, an instruction requesting a predetermined torque; and
calibrating the viscometer by controlling, by the controller, the electric motor to rotate the flywheel of the rotatable inertial load device at a predetermined acceleration corresponding to the predetermined torque to apply the predetermined torque to the coupling connected to the viscometer.

17. An inertial torque device (ITD) having a rotatable body for performing rheology measurements, the ITD comprising:
a body;
a coupling for connecting the ITD to a spindle for immersion in a fluid to be tested;
a rotatable inertial load device coupled to the body of the ITD;
an electric motor coupled to the rotatable inertial load device and coupled to the body; and
a controller configured to perform the rheology measurements by controlling the electric motor to rotate the inertial load device at a plurality of different predetermined accelerations to apply a plurality of predetermined torques to the spindle.

18. The ITD of claim 17, further comprising:
a user interface for setting the plurality of different predetermined torques of the ITD.

19. The ITD of claim 17, wherein the rotatable inertial load is a flywheel for applying the plurality of different predetermined torques to the coupling.

20. The ITD of claim 17, further comprising:
an encoder for monitoring the rotation of the body of the ITD;
wherein the controller is further configured to receive input from the encoder and determine rheological properties of the fluid under test.

21. The ITD of claim 17, further comprising:
a battery for powering the electric motor; and
a wireless battery charging station for charging the battery.

22. The ITD of claim 17, further comprising:
bearings for suspending the ITD above the fluid to be tested.

23. A self-contained spindle viscometer for measuring viscosity, the spindle viscometer comprising:
a body having a spindle shape, the body including a weighted bottom section for biasing the spindle viscometer in an upright position when immersed in a fluid to be tested; and
a rotatable inertial load device enclosed within the body of the spindle viscometer, the rotatable inertial load device including:
an electric motor coupled to the rotatable inertial load device,
a controller configured to perform viscosity measurements by controlling the electric motor to rotate the inertial load device to apply a predetermined torque to the body of the spindle viscometer, and determine a viscosity of the fluid under test based on the applied torque, and
a wireless interface for outputting the determined viscosity.

24. The spindle viscometer of claim 23, further comprising:
a user interface for setting the predetermined torque of the ITD.

25. The spindle viscometer of claim 23, wherein the rotatable inertial load device further includes a flywheel connected to the electric motor for applying the predetermined torque to body of the spindle viscometer.

26. The spindle viscometer of claim 23, further comprising:
an accelerometer for monitoring the rotation of the body of the ITD;
wherein the controller is further configured to receive input from the accelerometer and determine viscosity properties of the fluid under test.

27. The spindle viscometer of claim 23, further comprising:
a wireless power circuit for powering the electric motor.

28. The spindle viscometer of claim 23, further comprising:
a float incorporated into or attached to the body of the spindle viscometer for biasing the spindle viscometer in the upright position when immersed in the fluid to be tested.

29. The spindle viscometer of claim 23, further comprising:
a temperature sensor to determine the fluid temperature.

* * * * *